(12) United States Patent
Hardie

(10) Patent No.: US 6,211,655 B1
(45) Date of Patent: Apr. 3, 2001

(54) BATTERY CHARGER

(75) Inventor: Jonathan Owen Hardie, Berkshire (GB)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/501,152

(22) Filed: Feb. 9, 2000

(30) Foreign Application Priority Data

Feb. 11, 1999 (GB) .................................................. 9903089

(51) Int. Cl.[7] .......................................................... H02J 7/04
(52) U.S. Cl. ............................................................ 320/150
(58) Field of Search ............................................ 320/150

(56) References Cited

U.S. PATENT DOCUMENTS

| | | | |
|---|---|---|---|
| 4,775,827 | * 10/1988 | Ijntema et al. | 320/DIG. 21 |
| 5,519,303 | * 5/1996 | Goedken et al. | 320/150 |
| 5,541,496 | * 7/1996 | Simmonds | 320/151 |
| 5,563,496 | 10/1996 | McClure | 320/151 |
| 5,583,871 | 12/1996 | Simmonds | 320/151 |
| 5,621,302 | 4/1997 | Shinohara | 320/153 |
| 5,652,500 | 7/1997 | Kadouchi et al. | 320/150 |
| 5,705,915 | * 1/1998 | Douglas et al. | 320/152 |
| 5,747,970 | * 5/1998 | Johnson, Jr. et al. | 320/151 |
| 5,874,825 | * 2/1999 | Brotto | 320/150 |
| 6,020,721 | * 2/2000 | Brotto | 320/150 |

FOREIGN PATENT DOCUMENTS

| | | |
|---|---|---|
| 0 593 770 A1 | 4/1994 | (EP) . |
| 98/39810 | 9/1998 | (WO) . |

* cited by examiner

Primary Examiner—Peter S. Wong
Assistant Examiner—Pia Tibbits
(74) Attorney, Agent, or Firm—Sughrue, Mion, Zinn, Macpeak & Seas, PLLC

(57) ABSTRACT

A battery charger measures an average battery temperature at a pre-determined timing for a first fixed period after start of charging. If the number of consecutive positive second derivatives of battery temperature is four, charging is discontinued. If the number of consecutive positive second derivatives of battery temperature is not four, the charging is carried out continuously for a pre-determined secondary period.

27 Claims, 3 Drawing Sheets

BATTERY CHARGER

BACKGROUND OF THE INVENTION

1. Field of the Invention

The present invention relates to battery chargers and has particular though not exclusive application to chargers for use with mobile phones.

2. Description of the Related Art

Reference is made to the following publications which provide a background to the present invention:

U.S. Pat. No. 4,392,101 to Saar measures the rates of change of voltage during charging and determines the inflection points on the characteristic voltage versus time curve by means of a change in the sign of the second derivative of voltage.

U.S. Pat. No. 5,818,204 to Banyas et al is concerned with the charging of batteries having a temperature significantly different from the temperature of the charging environment. A timer is used to compensate for the loss of a temperature sensor within the battery pack by delaying the start of charging until the difference in temperature between battery and environment has reduced sufficiently.

U.S. Pat. No. 5,519,303 to Goedkin et al describes a battery charger control circuit which disables charging through detection of a change from negative to positive of the second differential of temperature coupled with reaching a predetermined threshold of the first derivative of temperature.

The rate at which a battery is charged is denoted by the factor C where C represents the charge current required to charge a battery in one hour. On this basis 1 C might be considered as a fast charging rate and ⅓ C as a medium charging rate. A very low charging rate, so called trickle charge would be perhaps 1/40 C.

The rates of change of voltage and temperature of a battery whilst charging will depend upon the charging rate. Both voltage and temperature will increase more quickly at a higher charging rate, say 1 C, than at a lower charging rate, say ⅓ C.

A graph of battery temperature versus charging time for most battery types will show a characteristic curve and reference is made to FIG. 1 which is a characteristic curve for a nickel metal hydride (NiMH) battery. A similar characteristic curve will apply to a nickel cadmium (NiCd) battery.

Measurements of the battery temperature taken during the charging process should provide an indication of the point on the characteristic curve reached by the battery at any time. When the point on the curve representing full charge of the battery is reached charging should cease.

The temperature can be measured continuously or can be sampled. Where the current state of charge can be determined with confidence, sampling can sometimes be discontinued or reduced over much of the charging cycle. Because of the variations in the state of different batteries, however, accurate and precise determination of the current state of charge relating to points on the characteristic temperature curve is difficult.

Variations in the state of different batteries offered for charging are introduced by a number of factors including the existing state of charge of the battery, a battery temperature much different to that of the ambient temperature of the charging circuit environment, the age of the battery, the number of re-charging cycles previously applied to the battery and previous use or misuse of the battery.

The state of charge of a battery connected to a charging circuit may range from a completely discharged battery to a completely charged battery. Determination of the state of charge of a battery solely by means of a measurement of the voltage across the battery terminals can often be unreliable.

With reference to the characteristic curve shown in FIG. 1 it can be seen that relatively steep rises of temperature occur at the points on the curve around the start of charge A and around the approach of completion of charge B. The rise in battery temperature at the start of charge can be misinterpreted as the approach of end of charge such that the charging cycle is terminated prematurely, resulting in an undercharged battery.

The temperature of a battery at the start of charging may differ from the ambient temperature of the local environment. An increase in battery temperature, not due to charging, will occur for example if a battery is brought into a warm room from a cold outdoors.

The temperature of the thermal mass of the battery unit will rise until the battery temperature is equal to the ambient temperature of the new environment. The rate of change of battery temperature is proportional to the difference between the battery temperature and ambient temperature. As the battery warms toward ambient there will therefore be a reduced rate of increase in battery temperature due to this thermal mass equalisation process.

If charging is started while the battery temperature is significantly different from ambient temperature then the additional rise in temperature due to the thermal mass equalisation could tend further to confuse the start of charge and completion of charge indications.

To avoid such misinterpretation it is known that a timer may be used to provide a start up period and maintain the charging rate through the early charging stage. As can be seen from the characteristic curve shown in FIG. 1, once the battery is charged past the relatively steep rises of temperature occurring at the points on the curve around the start of charge at A, the completion of charge around B may be determined more easily.

Problems with timers are experienced, however, when an almost fully charged battery is placed in circuit. The initial charging rate continuing for the full duration of the timer start up period would mask the detection of full charge. The battery would therefore overcharge and become permanently damaged.

SUMMARY OF THE INVENTION

It is an object of the invention to provide a battery charger with the ability to discriminate between a charged battery and an uncharged or partially charged battery before damage through overcharging occurs.

According to the invention an average battery temperature is measured at a pre-determined timing for a first fixed period after start of charging. If the number of consecutive positive second derivatives of battery temperature is four, charging is discontinued. If the number of consecutive positive second derivatives of battery temperature is not four, the charge is carried out at a pre-determined secondary period continuously.

The above and other objects, features, and advantages of the present invention will become apparent from the following description when taken in conjunction with the accompanying drawings which illustrate a preferred embodiment of the present invention by way of example.

DETAILED DESCRIPTION OF THE PREFERRED EMBODIMENT

One example of the invention will now be described with reference to the figures.

Figure 2:
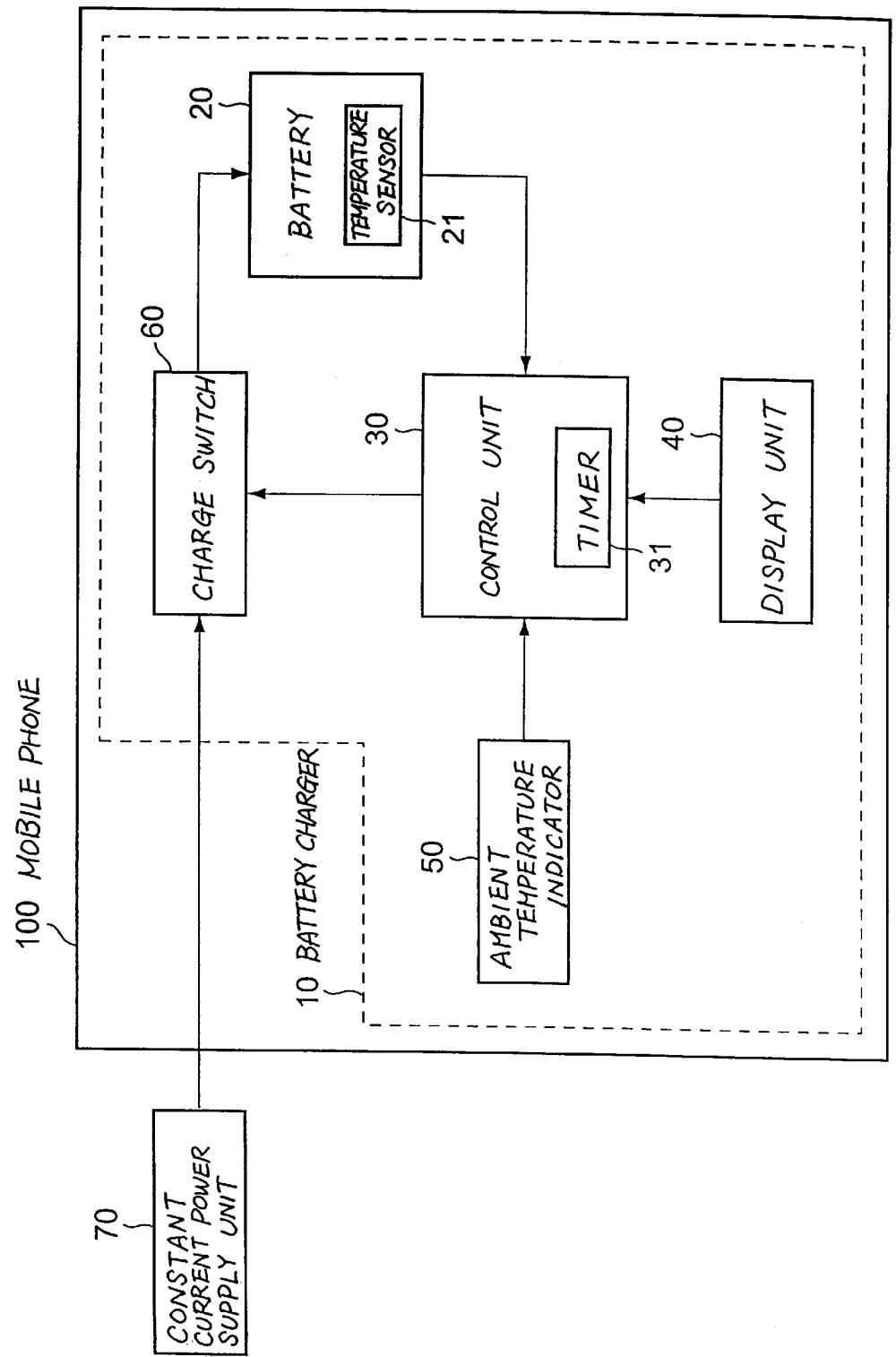
FIG. 2 is a block diagram of a battery charger according to the present invention.
Figure 3:
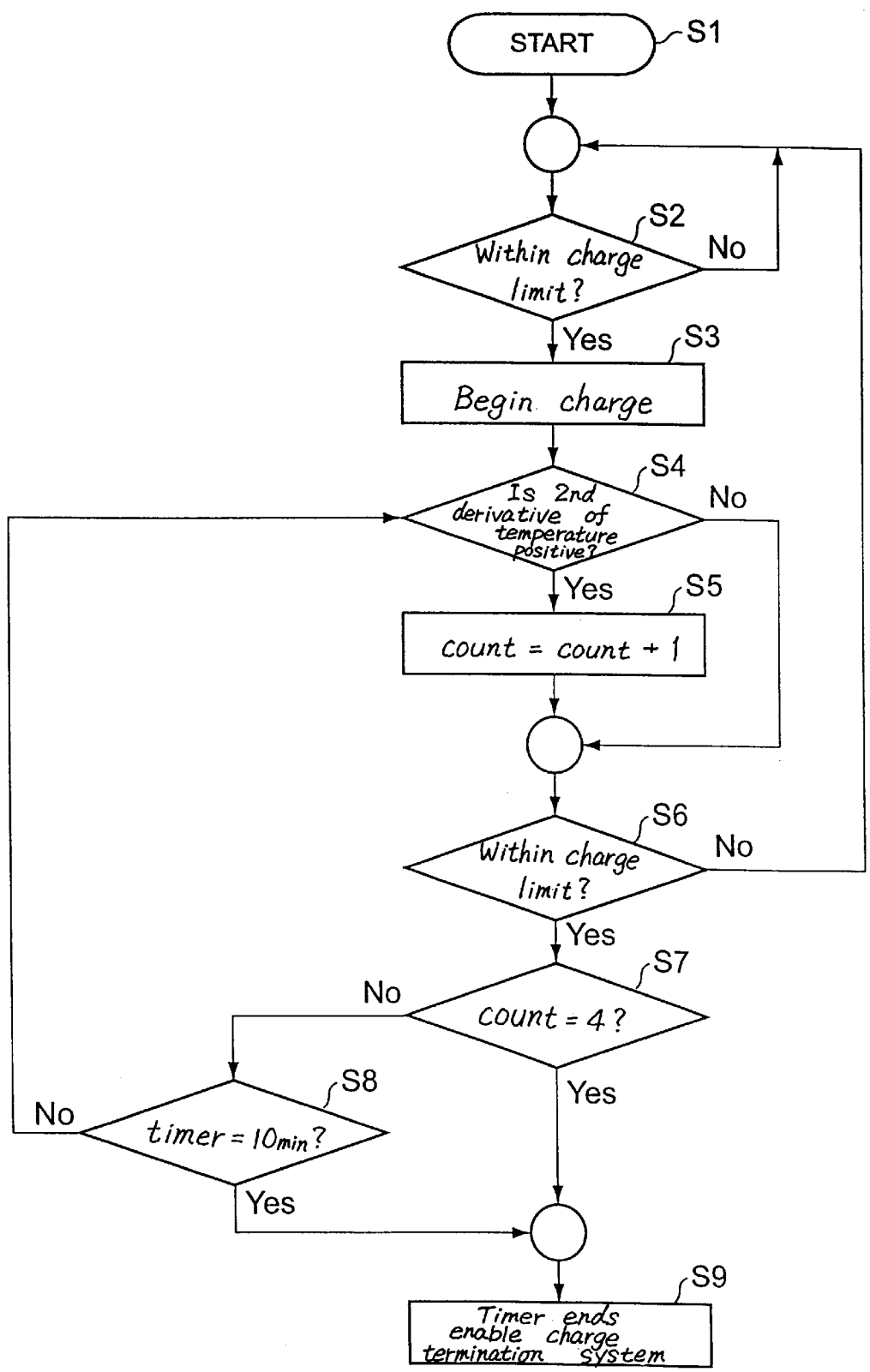
FIG. 3 is a flowchart illustrating charging of the battery charger shown in FIG. 2.

As shown in FIG. 2, a battery charger according to the prevent invention is installed in a mobile phone 100, and comprises a battery 20 charged by a charging current supplied from a constant current power supply unit 70, a charge switch 60 for controlling supply of the charging current to battery 20, display unit 40 for displaying the state of charge of the battery 20, an ambient temperature indicator 50 for measuring the temperature of the inside of the mobile phone 100, a control unit 30 for controlling the operation of the charge switch 60 based on the ambient temperature measured by the ambient temperature indicator 50, the temperature of the battery 20 and the passage of time from start of charging.

The battery has a temperature sensor 21 for detecting the temperature of the battery 20. The control unit 30 has a timer 31 for measuring the passage of time from start of charging. The ambient temperature indicator 50 and the temperature sensor 21 are thermistors.

Figure 1:
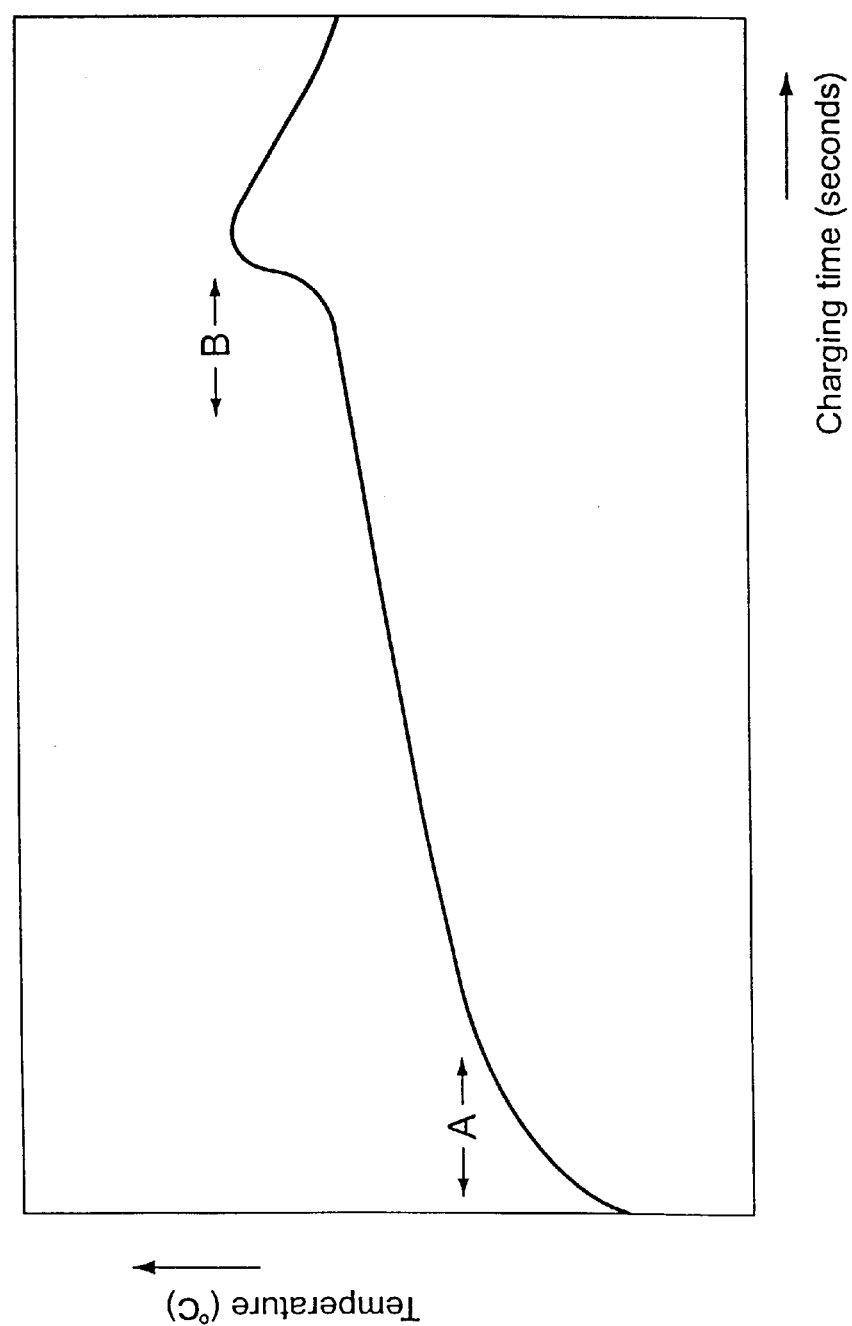
FIG. 1 is a plot of battery temperature versus charging time for a NiMH battery.

In this example the power supply unit 70 delivers a constant current for the whole of the charging period. Other power supply units may be used to supply a charging current which varies over the charging cycle. In these cases, however, the characteristic temperature versus time curves will differ from that shown in FIG. 1.

In the following, operation of charging of the battery charger having such a construction as described above is described.

The charging process is start at step S1, the voltage of the battery 20 $V_{bat}$ is compared with a pre-determined voltage threshold $V_{max}$ and the battery 20 temperature $T_{bat}$ is compared with upper $T_{max}$ and lower $T_{min}$ predetermined temperature thresholds by the control unit 30. The temperature $T_{max}$ arid $T_{min}$ and voltage thresholds $V_{max}$ will be set according to the particular batteries to be charged and the type and rate of charging to take place. Typical threshold values for charge limits at start of charging for a NiMH mobile phone battery are:

$T_{min}$=0° C., $T_{max}$=40° C. $V_{max}$=5.7 Volts

A further check made at step S2 is to confirm that the battery 20 temperature $T_{bat}$ is within +/−10 degrees Celsius of the ambient temperature $T_{amb}$ measured by the ambient temperature indicator 50.

If the battery voltage $V_{bat}$ is equal to the threshold $V_{max}$ or under and the battery temperature That is equal to $T_{min}$ or over and to $T_{max}$ or under and the battery temperature That is within +/−10 degrees Celsius of the ambient temperature $T_{amb}$, charging for a first fixed period begins at step S3 and the charge termination system is disabled.

If the battery voltage and the battery temperature exceed the threshold, the start of charging is prevented. Charging will begin only when the battery temperature is within the charge limits.

The start up timer of the invention may be used with any convenient charge termination system. The Fast-Charge IC bq2002T available from Benchmarq for example provides charge termination for NiCd and NiMH batteries.

At the first fixed period, in the control unit 30 a measure of $T_{bat}$ is taken at 10 second intervals from the start of charging. At an interval of 60 seconds from the start of charging, the average of value of the (six) measurements of That is recorded. Subsequently the measurements of $T_{bat}$ at each 10 second interval are continued and at 30 second intervals the value of $T_{bat}$ at the 30 second interval and the previous five measurements are averaged and recorded.

A characteristic of a discharged or partially charged battery is a reduction in the rate of change of temperature for consecutive periods at the beginning of charge. The second derivative of temperature ($d^2T/dt^2$) for consecutive periods should therefore be negative through the early period of charging. If the second derivative is positive for a number of consecutive periods then a fully charged battery is indicated.

After each 30 second interval the second derivative of the battery temperature is computed in the control unit 30 and any occurrences of a positive second derivative are counted at steps S4,S5. Where a zero second derivative is computed the count is held. Where a negative second derivative is computed any count is reset to zero.

A further check made at step S6 is to confirm that the battery voltage and temperature is within those thresholds and if the voltage and temperature exceed those thresholds, charging is discontinued and will not re-start until the charge limit conditions at step S2 are met.

If the voltage and temperature is within those thresholds, a further check made to confirm that the count in the control unit 30 is whether 4, that is, four successive periods having whether a positive second derivative of temperature at step S7. If the count is 4, the timer 31 ends and the charge termination system is enabled. The above is the operation of charging for the first fixed period.

Alternatively if the count is not 4, the timer 31 ends at the completion of the secondary period which is a charging period after the first fixed period i.e., totaling ten minutes from the start of charge at step S8. At the completion of the secondary period when the timer ends, the charge termination system is enabled at step S9. Thereafter charging continues until the charge termination system operates.

The minimum elapse of time for the first fixed period of charging is therefore set at two and one half minutes by the requirement for four successive measurements of the second differential of temperature. In this case, the secondary period is 7.5 minutes. These measurements will be available at 120, 150, 180 and 210 seconds et seq from start of charging. In the event that a fully charged battery is connected to the charger then that battery will be charged for 210 seconds before the charge termination system is enabled and for a further period of around 100 seconds while termination of charging is effected. Measurements continue through consecutive secondary period.

It has been found by experiment that good results are achieved and damage through overcharging prevented using these measurement intervals. The measurement intervals and/or the number of positive second derivatives counted before enabling the termination system, may be varied. By this means the timing of the first fixed period of charging may be reduced or increased. The timing of the consecutive secondary period may also be varied to suit particular requirements.

Although a certain preferred embodiment of the present invention has been shown and described and modifications may be made therein without departing from the scope of the appended claims.

What is claimed is:

1. A battery charger assembly comprising:
   a battery to be charged; and
   a control unit for measuring an averaged battery temperature at pre-determined times in a first fixed period after start of charging, for ending charging of said battery if the measurements meet pre-determined conditions after the first fixed period, and for causing continuous charging of said battery for a secondary period so long as the measurements do not meet the pre-determined conditions.

2. A battery charger according to claim 1, wherein said pre-determined conditions comprise consecutive positive second derivatives of the battery temperature at the predetermined times being a predetermined number.

3. A battery charger according to claim 2, wherein said number of consecutive positive second derivatives of battery temperature is four.

4. A battery charger according to claim 1, wherein said first fixed period is 2.5 minutes.

5. A battery charger according to claim 1, wherein said secondary period is 7.5 minutes.

6. A battery charger according to claim 1, wherein the temperature of said battery is measured by a thermistor.

7. A battery charger according to claim 1, wherein the start of charging is prevented when measured battery temperatures are beyond one of an upper and a lower predetermined threshold.

8. A battery charger according to claim 1, wherein said battery is installed in a mobile phone.

9. A battery charger according to claim 8, further comprising:
an ambient temperature indicator for measuring the temperature of the inside of the mobile phone;
wherein start of charging is prevented when a difference greater than a predetermined threshold value exists between a battery temperature measurement and an ambient temperature measured by said ambient temperature indicator.

10. A battery charger according to claim 1 further comprising:
a charge switch for controlling supply of current to said battery, said switch controlled by said control unit.

11. A battery charger according to claim 1 further comprising:
a display unit for displaying the state of charge of said battery.

12. A battery charger according to claim 1, wherein said pre-determined conditions comprise a temperature of said battery being within a range of temperatures about an ambient temperature.

13. A battery charger assembly comprising:
a battery to be charged; and
a control unit operative to:
measure a temperature of said battery at predetermined intervals from a start of charging said battery, and record an average of the temperature measurements for predetermined portions of a first fixed period;
compute a second derivative for each average, and determine whether the second derivative is positive;
count a number of positive second derivatives and reset the count when the second derivative is negative;
determine whether a temperature and a voltage of said battery are outside predetermined limits and, if so, generate a first event;
generate a second event when the count reaches a predetermined number.

14. A battery charger assembly as claimed in claim 13, wherein said control unit further comprises a timer that generates said second event when a timer time has expired, the timer time being greater than or equal to the first fixed period.

15. A battery charger assembly as claimed in claim 13, wherein said second event is an enablement of a charge termination system.

16. A battery charger assembly as claimed in claim 13, wherein said first event is an enablement of a charge termination system.

17. A battery charger assembly comprising:
a battery to be charged; and
a control unit for measuring a battery temperature at pre-determined times in a first fixed period after start of charging, for ending charging of said battery if the measurements meet predetermined conditions after the first fixed period, and for causing continuous charging of said battery for a secondary period so long as the measurements do not meet the pre-determined conditions.

18. A battery charger according to claim 17, wherein said pre-determined conditions comprise consecutive positive second derivatives of the battery temperature at the predetermined times being a predetermined number.

19. A battery charger according to claim 18, wherein said number of consecutive positive second derivatives of battery temperature is four.

20. A battery charger according to claim 17, wherein said first fixed period is 2.5 minutes.

21. A battery charger according to claim 17, wherein said secondary period is 7.5 minutes.

22. A battery charger according to claim 17, wherein the temperature of said battery is measured by a thermistor.

23. A battery charger according to claim 17, wherein the start of charging is prevented when measured battery temperatures are beyond one of an upper and a lower predetermined threshold.

24. A battery charger according to claim 17, wherein said battery is installed in a mobile phone.

25. A battery charger according to claim 24, further comprising:
an ambient temperature indicator for measuring the temperature of the inside of the mobile phone;
wherein start of charging is prevented when a difference greater than a predetermined threshold value exists between a battery temperature measurement and an ambient temperature measured by said ambient temperature indicator.

26. A battery charger according to claim 17, further comprising:
a charge switch for controlling supply of current to said battery, said switch controlled by said control unit.

27. A battery charger according to claim 17, further comprising a display unit for displaying the state of charge of said battery.

* * * * *